A. GOODNIGHT.
CLAMP FOR ATTACHING AUXILIARY RIMS TO WHEELS.
APPLICATION FILED OCT. 23, 1918.
1,322,301. Patented Nov. 18, 1919.
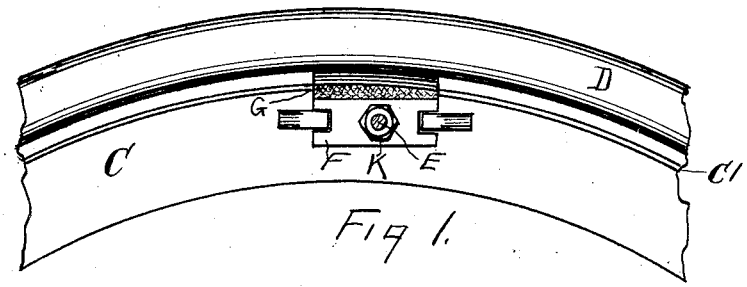
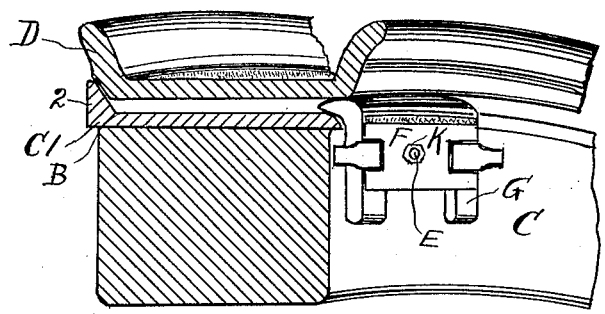
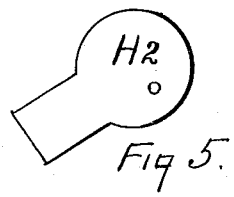
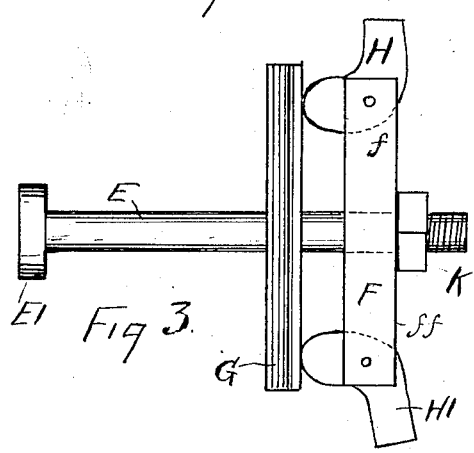
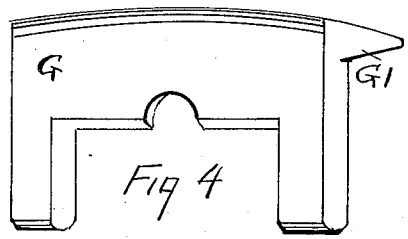
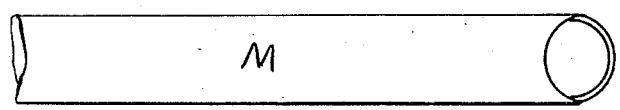
INVENTOR
Austin Goodnight
BY
Francis C Huebner
ATTORNEY

UNITED STATES PATENT OFFICE.

AUSTIN GOODNIGHT, OF KINGSBURG, CALIFORNIA.

CLAMP FOR ATTACHING AUXILIARY RIMS TO WHEELS.

1,322,301.  Specification of Letters Patent.  Patented Nov. 18, 1919.

Application filed October 23, 1918. Serial No. 259,414.

*To all whom it may concern:*

Be it known that I, AUSTIN GOODNIGHT, a citizen of the United States, and a resident of the town of Kingsburg, in the county of Fresno and State of California, have invented a new and useful Clamp for Attaching Auxiliary Rims to Wheels, of which the following is a specification.

My invention relates to a clamp for attaching auxiliary detachable rims to wheels, and it is especially useful for automobile wheels having detachable rims on which pneumatic tires can be placed, my invention being an improvement on clamp means for attaching such auxiliary rims to wheels, and more especially to an improvement in a wedge and means for pressing the wedge between the auxiliary rim and the ordinary rim on the wheel.

In the drawing accompanying this specification, Figure 1 shows an elevation of the device complete as attached to the rim. Fig. 2 is a perspective view of the device complete. Fig. 3 is a top view of the clamp. Fig. 4 is a perspective view of the wedge. Fig. 5 is an eccentric clamp which can be substituted for the form shown in Fig. 3. Fig. 6 is a socket wrench adapted to be used to move the clamps.

In said drawing B represents the periphery of the wheel, said periphery having a flange 2 around one side thereof. C is the felly of the wheel which is preferably bound with an annular band $C^1$. Band $C^1$ has an annular flange 2 around one side thereof which slopes from its periphery of the largest diameter toward the opposite side of the band. D is the auxiliary rim of the wheel to which the tire is attached. The inside diameter of the auxiliary rim D should be slightly greater than the outside diameter of the band $C^1$ and less than flange 2. E is a bolt passing crosswise through felly C, having a head on one end which can be of any suitable shape to hold the bolt firmly and so that it will not pull through the felly. G is a wedge which is formed in the shape of a plate having a flange on one end thereof thicker at its base than at the opposite end. This plate is formed so it can rest on the top of the bolt E when the wedge is in a position to enter between the auxiliary rim D and the band $C^1$. The flange on this plate should be curved to conform with the curve on the auxiliary rim. F is a support having a hole through the center thereof through which bolt E passes, said support having extensions $f$ and $ff$ on each side of bolt E. H and $H^1$ are toggle members which are pivoted, one at each end of support F. These toggle members are in the approximate form of an L, and are pivoted near the angle. The equivalent of toggle members H and $H^1$ can be formed by an eccentric clamp $H^2$, shown in Fig. 5. K is an adjusting nut for the purpose of moving the support F nearer to, or farther away from the felly C through which bolt E passes. M as shown in Fig. 6, is a socket wrench which fits on the end $h$ of the cam member H. It is intended that a plurality of these clamps shall be placed around the periphery of the wheel, and when the auxiliary rim is placed in its working position, the wedges G should be adjusted between the auxiliary rim and the felly of the wheel, and by use of the adjusting nut K the support F can be moved to a point so that when the cams H and $H^1$ are adjusted to the point at which they exert the pressure desired on wedge G, wedge G will be tightly inserted between the auxiliary rim D and the felly C and band $C^1$, so that the said auxiliary rim is tightly attached to the wheel. When it is desired to remove the auxiliary rim by use of wrench M, the cams H and $H^1$ can be instantaneously released which will in turn release the wedge G, which can be readily removed from its position between the auxiliary rim and the band, thus permitting the auxiliary rim to be slid off, or on the wheel. The nut K can be adjusted and locked into such adjusted position, as the nut need not be loosened to remove or replace the auxiliary rim on the wheel.

Having described my invention, I claim as new—

In a device of the character described the combination of a wheel having a vertical flange on one side of the rim, said flange sloping from the line of its periphery toward the opposite side of the rim, an auxiliary rim having an inside diameter less than the periphery of the flange, a plurality of curved wedges adapted to enter between the rim of the wheel and the auxiliary rim, each of said wedges having depending portions, and clamp means for holding the wedges between the rim and the auxiliary rim comprising a base bolted to the wheel, and a lever having an eccentric member attached thereto pivoted at each end of the base and disposed to bear against opposite ends of the wedge, substantially as described.

AUSTIN GOODNIGHT.

Witnesses:
 CLEO K. CURTIS,
 H. A. HUEBNER.